Dec. 2, 1947.　　　　　H. Y. JENNINGS　　　　　2,432,075
ROLL OF SHEET MATERIAL WITH COHESIVE COATING
Filed Nov. 4, 1943
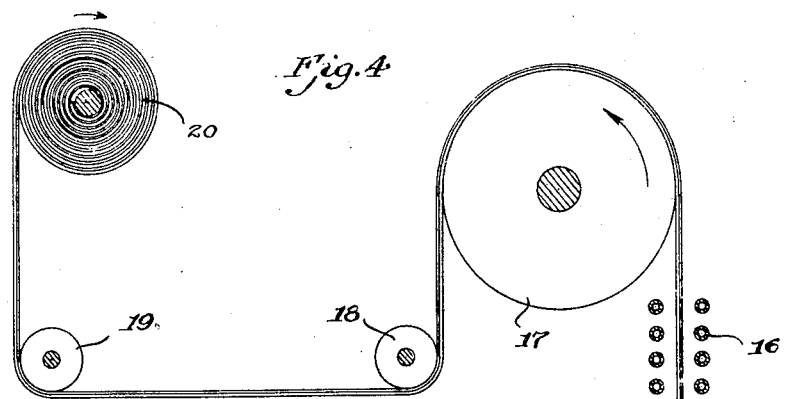
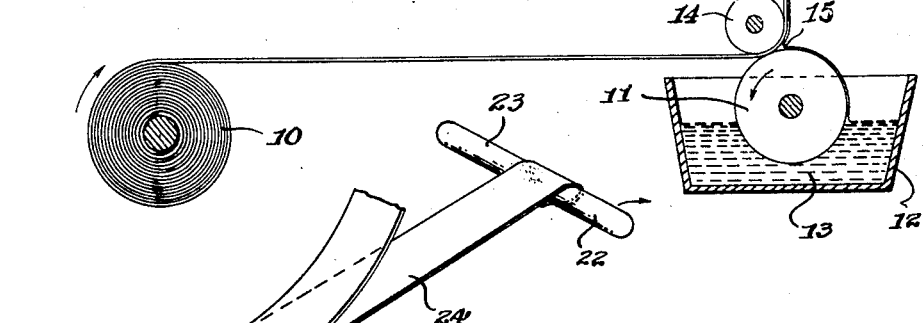
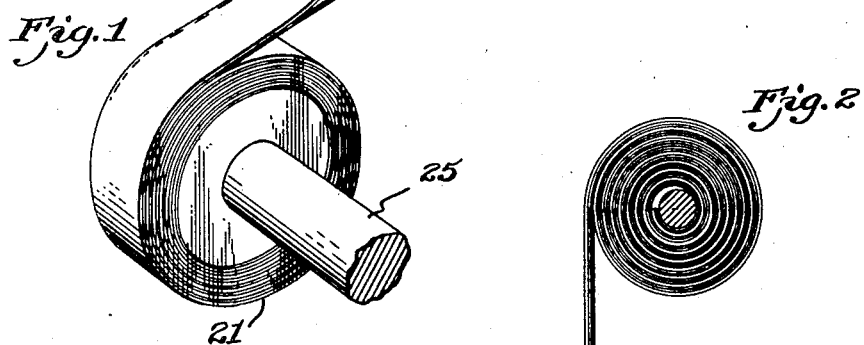
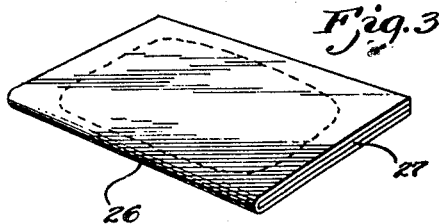
INVENTOR.
Harley Y. Jennings
BY Barnes, Kisselle, Laughlin & Raisch
Attorneys.

UNITED STATES PATENT OFFICE 2,432,075

ROLL OF SHEET MATERIAL WITH COHESIVE COATING

Harley Y. Jennings, Clio, Mich., assignor to Copeman Laboratories Company, Flint, Mich., a corporation of Michigan Application November 4, 1943, Serial No. 508,943

1 Claim. (Cl. 206—59)

This invention relates to a coated paper product and more particularly to a laminated product that may be conveniently dispensed and used for wrapping and the like.

It is an object of the present invention to provide a transparent laminated sheet which is self-adhering to a very high degree and which may be used for wrapping and sealing articles. It is a further object to provide an article made up of the laminated sheet which serves to maintain the elements thereof in a predetermined condition for an indefinite length of time until they may be dispensed for use.

This application is a continuation in part of application Serial No. 349,561, filed August 2, 1940.

Other objects and features of the invention will be brought out in the following description and claim.

In the drawings:

Fig. 1 illustrates a roll of laminated paper constructed in accordance with the invention.

Fig. 2 illustrates a roll of laminated paper formed with a liner or slip sheet.

Fig. 3 shows an article wrapped in the transparent paper self-sealed after dispensation from a roll.

Fig. 4 illustrates a simple mechanism for applying the latex to rolled paper.

The present invention contemplates the use of transparent backing materials such as Cellophane, glassine, Pliofilm, or regular stock paper, thin grade. A transparent coating is also contemplated in the form of latex. It is known to form a sheet of latex by the use of two coated sheets applied face to face. The two coated sides join to form a homogeneous single layer of rubber. This may be dispensed by tearing the paper and pulling the rubber sheet from between the covering layers of paper. When thus dispensed the rubber is in a partially cured or set-up state so that it has the property of being not particularly sticky or tacky relative to dissimilar surfaces but it will cohere (adhere to itself) very readily to form homogeneous rubber coatings or rubber bands, etc.

The present invention contemplates the use of a single coating of paper to form the means for dispensing a rubber sheet. The article to be herein claimed is formed by coating one side of a paper strip with latex as an aqueous dispension in water. This latex dispension is permitted to set up partially in air but it should not cure or set-up fully. Prior to full curing, or setting up, the strip is rolled upon itself so that the treated side is protected from the air and further curing or setting up is prevented.

The latex should be applied in such a manner as to provide a smooth continuous and heavy film when it is dried, and should be non-tacky, so that it will leave no deposit when it is removed from a surface to which it has been applied for protective purposes, such for example as a glass or enameled surface or a polished metal surface. Further, the latex film should be quite substantial and heavy; that is, it should be capable of being distorted or extended without rupturing. An important feature of my invention therefore is the provision of a laminated latex and paper sheet wherein the latex film is heavy or thick enough to distort and stretch even though the backing sheet of paper be torn or ruptured.

Referring specifically to Fig. 4, 10 designates a roll of paper to be coated. In practising my invention I prefer to use a paper such as ordinary 25 to 40 pound kraft paper which has been polished or super-calendered on one side only. The latex film is applied to the other side, which is of ordinary texture, slightly porous and rough, so that the latex film will adhere firmly thereto. When the laminated paper is being unrolled, however, after the latex film has been set, the latexed surface which contacts the polished back surface of the paper will readily separate therefrom without taking any paper particles or lint with it. Instead of having a super-calendered surface on one side of the paper, which is obtained by a mechanical polishing action, I may use a paper which has had one side filled with starch to give a smooth polished surface.

The paper travels from the roll 10 in a general horizontal direction to the coating roll 11. The roll 11, which is preferably made of polished metal, dips into a trough 12 containing the latex bath 13. The paper to be coated is held in contact with the coating roll 11 by a smaller roll 14. There are three important factors with respect to this coating mechanism which cooperate to provide a smooth, uniform latex coating.

(1) The coating roll turns in the direction opposite that in which the paper is moving;

(2) The rate of rotation of the coating roll is faster than the rate at which the paper moves, preferably about twice as fast, and (3) The position at which the paper leaves the coating roll is substantially at a right angle to the horizontal position at which it contacts the roll 11 and is somewhat off-center (to the left in Fig. 4) with respect to the vertical center line of the coating roll.

This arrangement of parts provides a pocket 15 formed in the angle between the vertically-moving paper and the coating roll. Because of its relatively high speed and the direction in which the coating roll 11 moves an excess of latex is maintained in the pocket 15, thus assuring an ample supply at all times and insuring a relatively heavy uniform coating. An additional feature of this arrangement, as has been shown by repeated operation, is that there is coagulation of the latex around the roll as is common with other coating devices.

The concentration of the latex bath is determined by the thickness of the film to be deposited. I have found that concentrations of from 20% to 40% solids are satisfactory depending on the ultimate use to which the paper is to be put. The latex bath may be pure latex or it may be compounded with suitable ingredients such as stabilizers, fillers and deodorants. I have found that a compounded latex sold by American Anode Inc. of Akron, Ohio, under the name Protex No. 11776 is particularly suited for paper coating purposes; Protex 11776 is an ammonia-preserved concentrated natural rubber latex composition containing approximately 40% to 60% solids and having as its essential compound ingredients sulphur and age resister.

After being coated, the paper may be passed adjacent a heating element 16, which may be steam coils or an electric element, and then passes, with its coated side exposed, over a heated drum 17. The element 16 and the drum 17 remove substantially all the moisture from the coated paper, and the drum 17 also helps to smooth the paper. The paper then passes under guide rolls 18 and 19 and is wound, with the coated side innermost into a roll 20.

The factors of time and temperature are most important in conditioning the latex-coated surface before the paper is rolled. The main point is that substantially all the moisture should be removed before the paper is rolled, but the heat applied, and the time the latexed surface is exposed to the air should be just short of that required to "cure" or set the rubber film deposited from the latex. This leaves the deposited rubber surface in such a condition that when it is unrolled, the latexed surface will be self-adherent when contacted with itself and forms a homogeneous rubber mass which cannot be again separated to its original form. Generally speaking the heat applied should not exceed the boiling point of water, namely 212° F. although this should not be construed a strict limitation, for the exact temperature will be determined by the nature of the latex compound used. Likewise, the time of exposure to the air before winding should be less than that required to "cure" or set the latex. The ordinary paper coating machine runs at a speed fast enough to prevent "curing" or setting up of the latex.

When the coated roll is completed the latexed surface is protected from the atmosphere so that no further curing or setting up takes place, and when the sheet is unrolled the latexed surface is in such condition that when pressed upon itself the latex is self-sealing and forms a homogeneous body which cannot be separated from itself.

Prior to being unrolled, the paper may be slit and rolled in strips of any suitable width. Such a rolled strip is shown at 21 in Fig. 1. A roll of this may be used to dispense a latex film or sheet, for example, where an article is to be wrapped with latex without any paper being used. One application of such a sheet is shown in Fig. 1 where two rods 22, 23 are being spliced by overlapping their ends and then wrapping them with a latex strip 24 which is withdrawn from the roll.

The roll 21 may be supported on a shaft 25 which is in turn supported by any suitable means (not shown). The roll should rotate on this shaft, but not too freely, as it has been found that the latex sheet strips from the roll more easily if the roll offers some resistance to the force exerted in stripping the latex sheet from the roll.

Thus, when an article such as the rods 22, 23 are to be wrapped with a latex sheet, a break is made in the paper at its free end and the latex strip 24 is drawn from the roll by turning the article to be wrapped. The self-sealing properties of the latex strip allow both hands of the operator to be used to turn the article being wrapped, and by suitable manipulation a uniform homogeneous coating of latex is formed around the article 23, 24 or such parts of it as it may be desirable to cover. When the article is wrapped, the latex strip and the loose paper may be cut off leaving the roll ready for a subsequent operation.

In some cases it may be desired to wrap an article in a single sheet of latex-coated paper without separating the latex from the paper, in order to provide a package sealed against dust and moisture. To accomplish this result, a sheet of the latex-coated paper of suitable width is cut off from the roll. The sheet is laid on a flat surface with its coated side up, and the article to be sealed is laid on the sheet adjacent, but not touching one edge thereof. The remainder of the sheet is then folded over the article and the contacting latex surfaces are firmly pressed together around the edges of the article. Thus the article is not only sealed against dust and moisture, but its surfaces are protected against marring and abrasion by a layer of paper superposed on a resilient rubber film. A sealed package such as has just been described is indicated at 26 in Fig. 3 wherein 27 indicates one of the latex-sealed edges of the package.

Obviously, the latex film may be of any desired thickness, determined by the concentration of the latex bath and the number of times the paper is run through the coating bath. It is necessary, however, that the applied rubber film be dried before the next film is applied.

The terms "latex," "aqueous dispersions of rubber," and "rubber" as used in the specification and claims are intended to cover both natural and synthetic materials or combinations of natural and synthetic materials, as well as compounds or mixtures of natural or synthetic lattices with other ingredients which may be added to impart stability, fluidity, viscosity and other desirable features to the coating bath, provided that the resultant film is non-tacky and has the property of self-adhesion.

When kraft paper is used in the above process, with one side polished, it is satisfactory. In some cases a transparent backing is desirable such as Pliofilm or Koroseal. However, the latex has been found to react with these substances so that when once rolled, further dispensing is impossible. The present invention contemplates the use of a liner with the rolled, coated strip, the liner being wax paper or some similar substance which will not react with and stick to the rubber coating. See Fig. 2.

When unrolled the latex surface which is presented will be of a nature to cohere and may be folded around various objects to envelop the same and seal in a homogeneous rubber seal.

Whenever the word "cohere" is used in the specification and claims it shall be taken to mean that the surface referred to will adhere to itself or to another similar surface to form a homogeneous, inseparable sheet of rubber.

What I claim is:

An article comprising a rolled strip of imperforate sheet material, only one of the surfaces of which is coated with and has bonded firmly thereto a temporarily cohesive latex membrane from which all the water has been removed, said membrane being formed by the application of an aqueous dispersion of rubber to the imperforate sheet material, said membrane being in a partially set-up state and substantially non-tacky but still capable of cohering to itself to form a homogeneous membrane of double thickness, said membrane being distortable and stretchable even though the imperforate backing material is ruptured, said strip of sheet material being rolled tightly to maintain the temporary cohesive properties of said membrane, said membrane contacting but not adhering to the back of the sheet material in said roll, and said coated strip of sheet material remaining cohesive a sufficient length of time, after being unrolled without sticking, whereby it will cohere to a similar surface to form sealed packages and the like.

HARLEY Y. JENNINGS.

REFERENCES CITED

The following references are of record in the file of this patent:

UNITED STATES PATENTS

| Number | Name | Date |
| --- | --- | --- |
| 1,444,061 | Butler | Feb. 6, 1923 |
| 1,885,007 | Rosenblatt | Oct. 25, 1932 |
| 2,040,608 | Hinrichs | May 12, 1936 |
| 2,144,263 | Lane | Jan. 17, 1939 |
| 2,209,601 | Heywood | July 30, 1940 |
| 2,247,925 | Sebrell | July 1, 1941 |
| 2,191,704 | Bennett | Feb. 27, 1940 |
| 2,120,461 | Copeman | June 14, 1938 |
| 2,075,178 | Copeman | Mar. 30, 1937 |